May 14, 1968
J. A. PAGET
3,383,286
CORE ELEMENT HANDLING SYSTEM
Filed Sept. 27, 1966
8 Sheets-Sheet 2
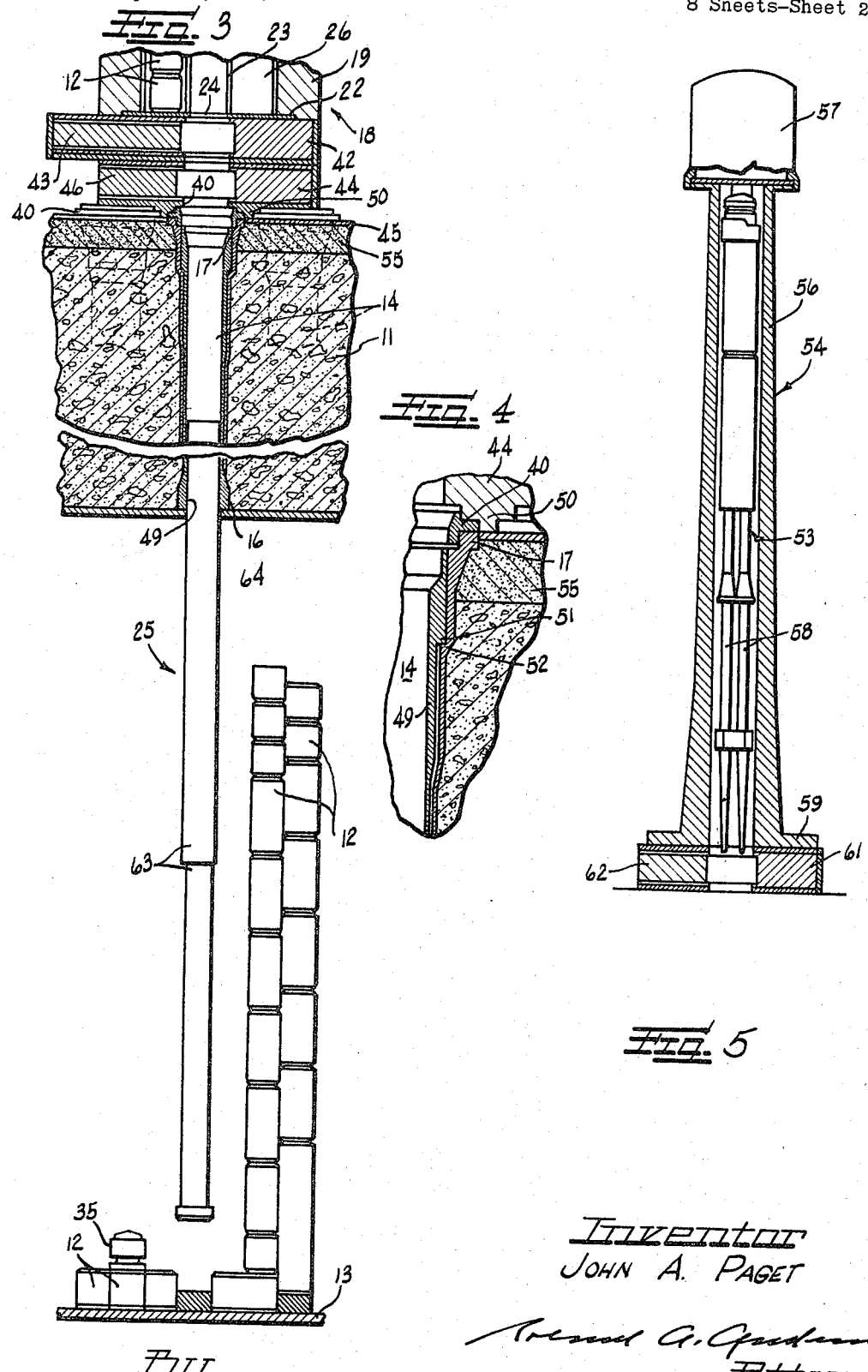
Inventor
JOHN A. PAGET
By
Attys.

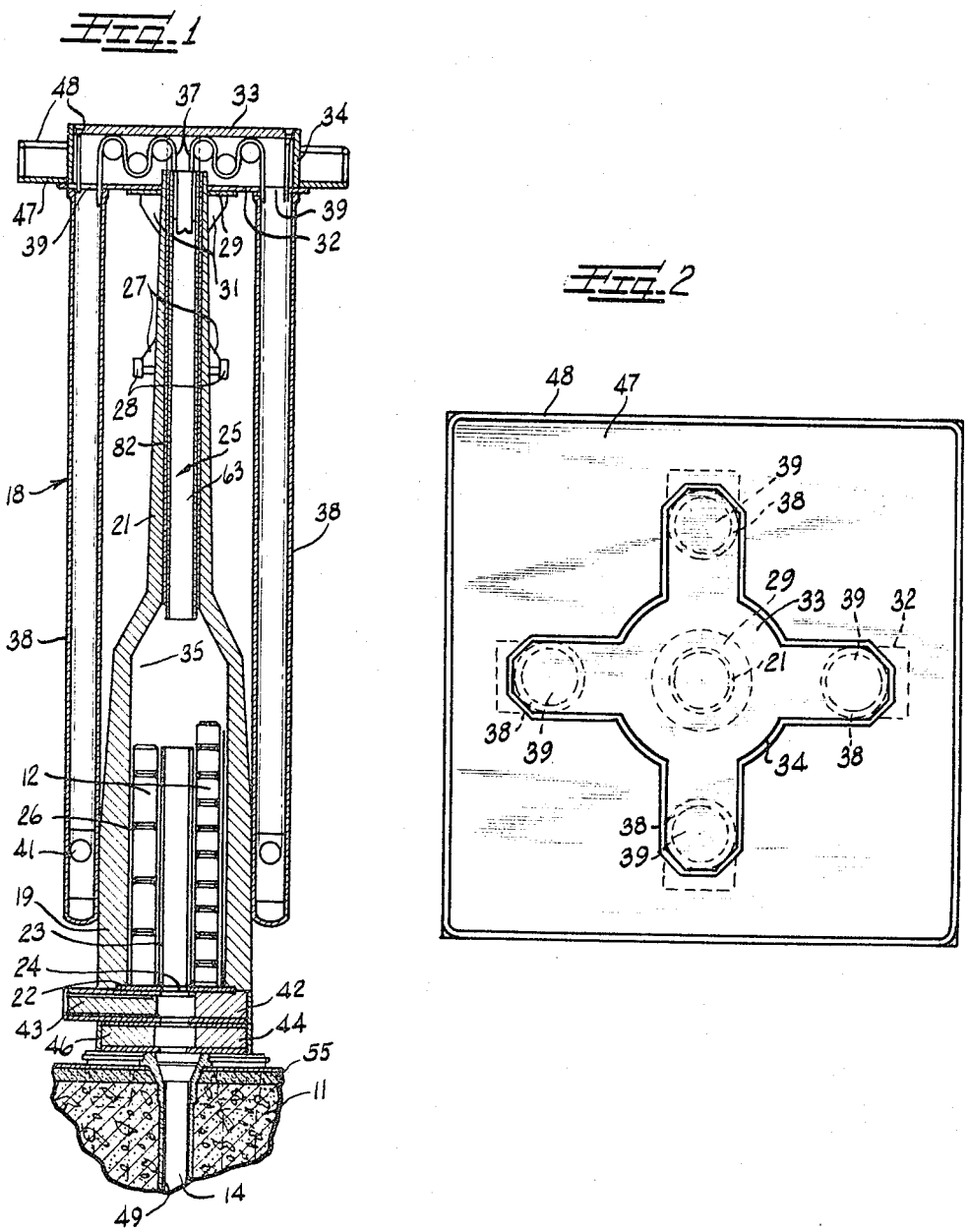

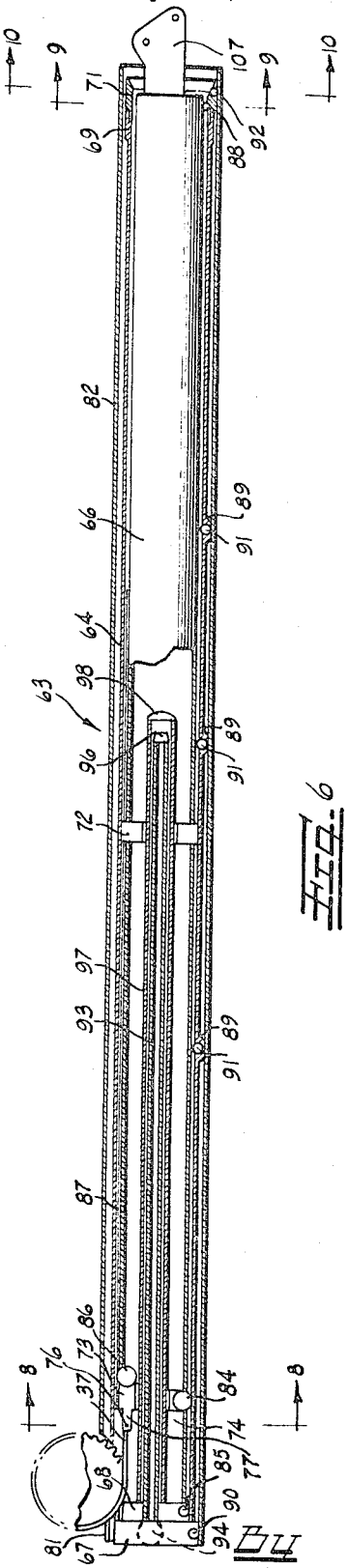
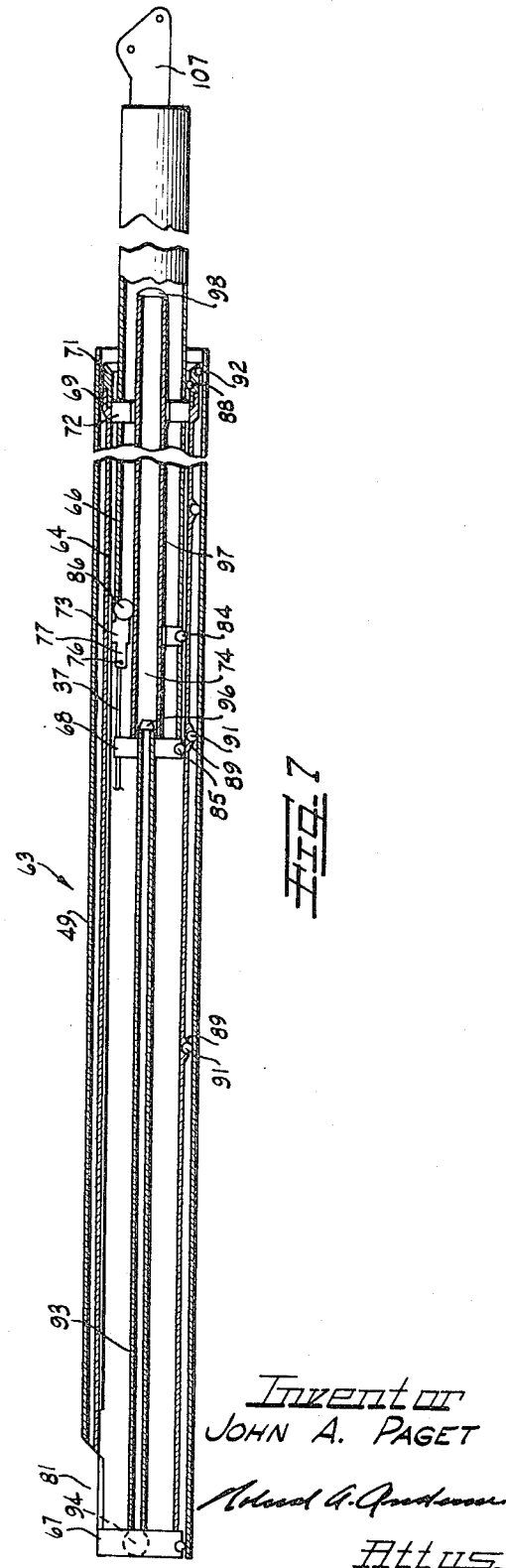

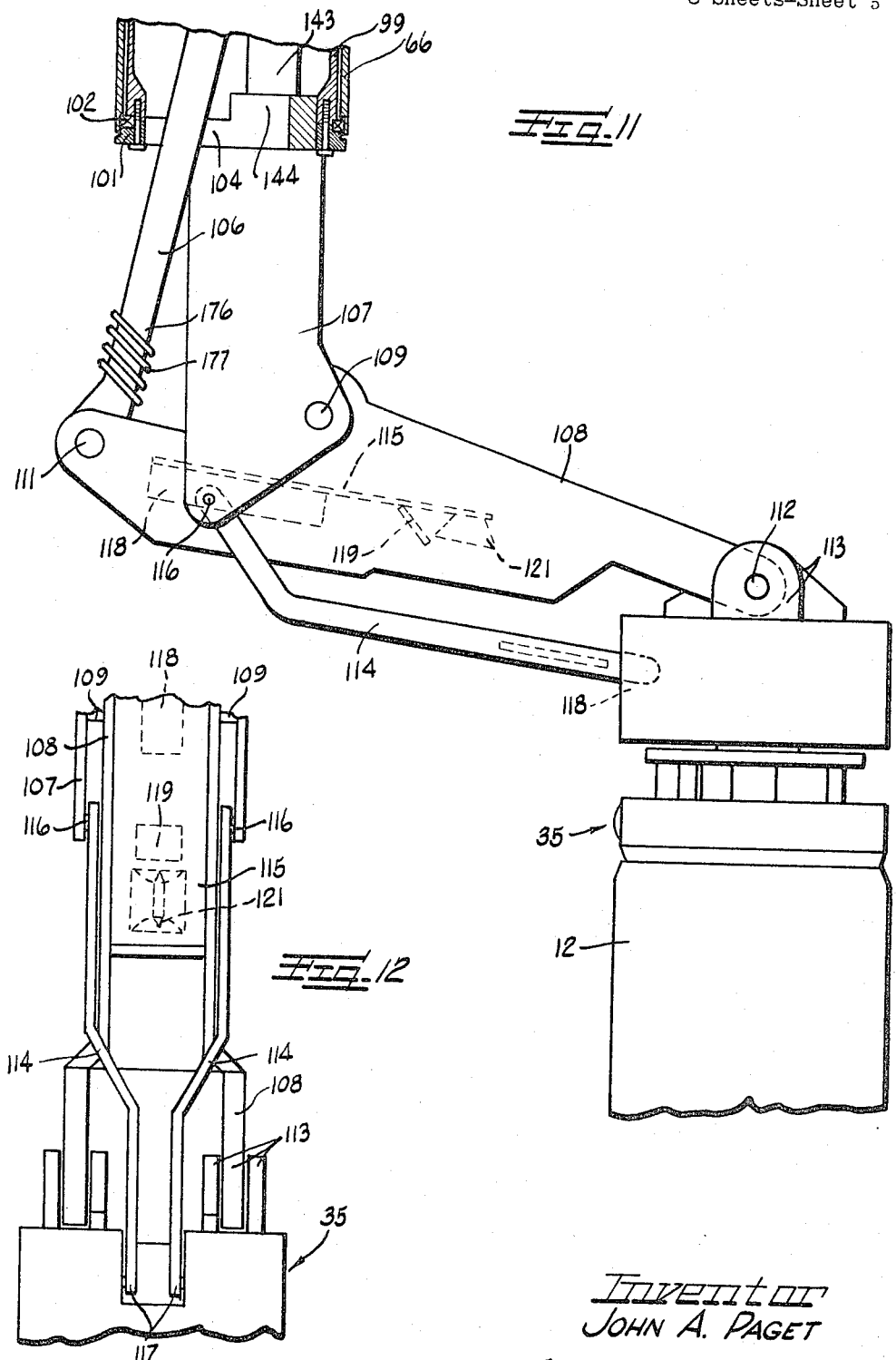

May 14, 1968
J. A. PAGET
3,383,286
CORE ELEMENT HANDLING SYSTEM
Filed Sept. 27, 1966
8 Sheets-Sheet 6
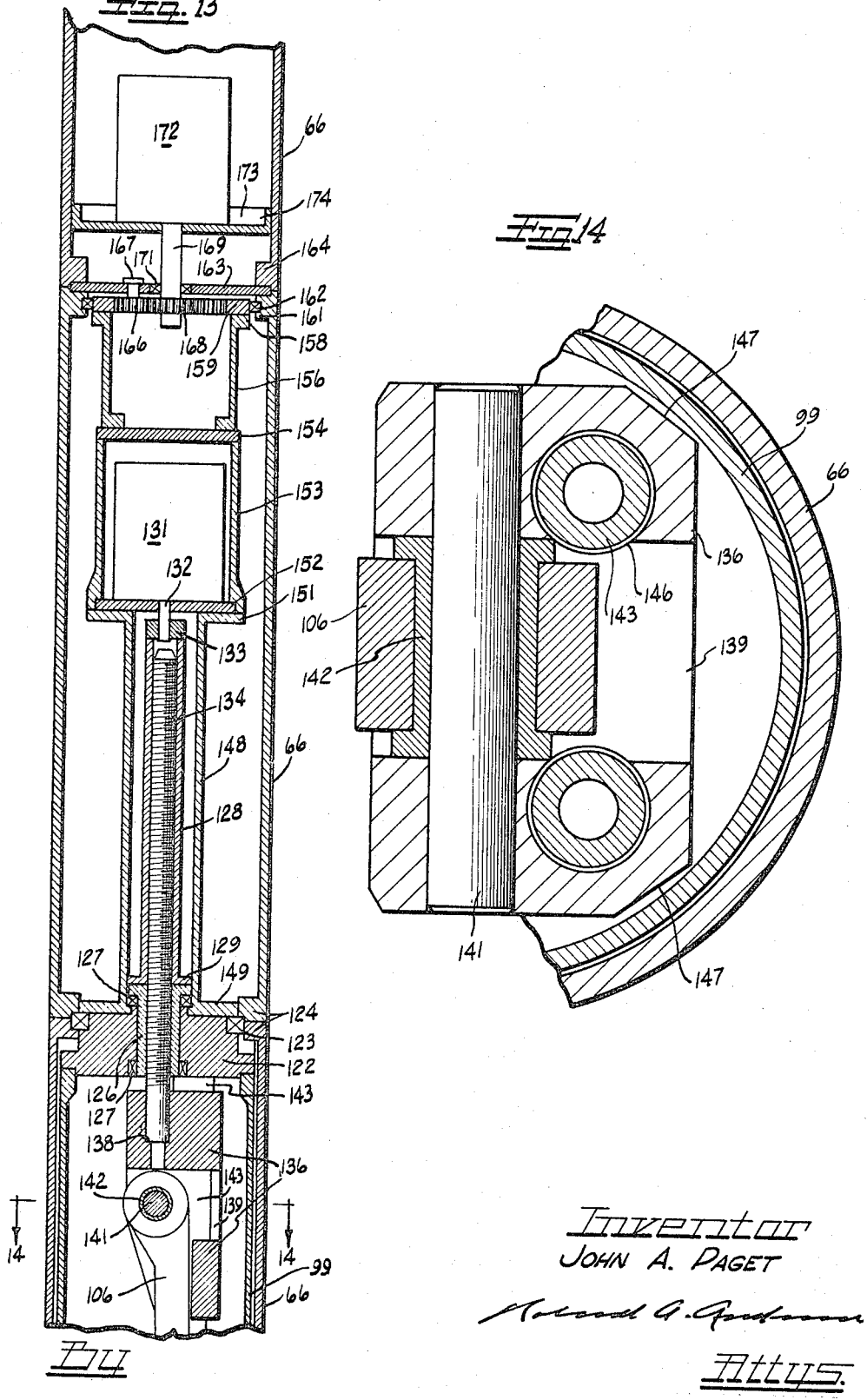
Inventor
JOHN A. PAGET
Attys.

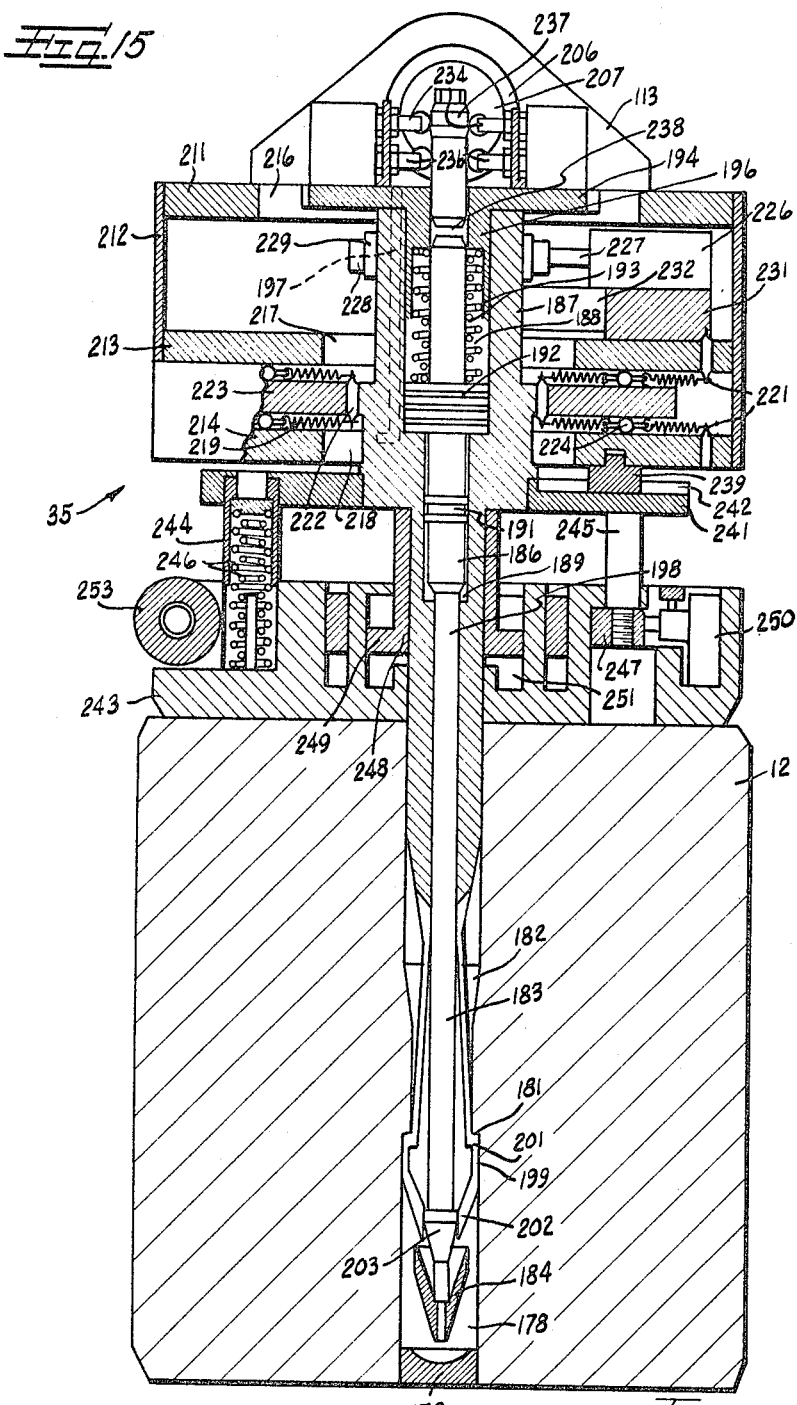

May 14, 1968     J. A. PAGET     3,383,286
CORE ELEMENT HANDLING SYSTEM
Filed Sept. 27, 1966     8 Sheets-Sheet 8

Inventor
JOHN A. PAGET

United States Patent Office 3,383,286
Patented May 14, 1968

3,383,286
CORE ELEMENT HANDLING SYSTEM
John A. Paget, Poway, Calif., assignor to the United States of America as represented by the United States Atomic Energy Commission
Filed Sept. 27, 1966, Ser. No. 583,139
9 Claims. (Cl. 176—30)

ABSTRACT OF THE DISCLOSURE

A system for handling a plurality of removable core elements for a nuclear reactor. A sleeve penetrates the core and contains a lifting assembly with a telescopable section having inner and outer coaxial tubes coupled with a pneumatic device to move said tubes.

This invention relates generally to nuclear reactors and, more particularly, to an improved core element handling system for a nuclear reactor. The invention also relates to improved apparatus which may be used in such a handling system, and to an improved method of loading and unloading a core which may be performed by the system of the invention.

Many types of nuclear reactors comprise a plurality of removable core elements forming a core. Such core elements may be comprised of fissile or fertile material, neutron moderating material, neutron reflecting material, or combinations of some or all of these. Before starting reactor operation, the core is usually formed of the core elements and, after certain periods of operation, the core is usually refueled by replacing some or all of the core elements containing fissile material. Periodic replacement of core elements containing fertile, moderating or reflecting material may also be necessary.

Frequently, some type of reactor vessel is provided for enclosing the core to contain radioactive products in the event of an accident and, if desired, to also provide a biological shield for personnel working about the reactor. A reactor vessel may also be constructed to contain a liquid or gas coolant for the core.

When the reactor vessel is so designed as to completely enclose the core, a suitable penetration may be provided in the reactor vessel in order that the core elements can be placed in and removed from the reactor vessel. The provision of one or more penetrations for core element handling, in addition to other penetrations in the reactor vessel for such things as instrumentation and control rods, may result in so many penetrations as to make it difficult or expensive to secure proper integrity for the reactor vessel. The use of some penetrations for more than one purpose, such as utilizing the control rod penetrations for refuelling, is therefore desirable.

Some problems may arise in connection with the utilization of a single penetration for more than one purpose. One such problem pertains to insuring proper guidance of the means for picking up and moving the core elements without the need for elaborate or expensive apparatus and without the need for enlarging the penetration extensively. In addition to the problems related to providing adequate guidance, mentioned above, a problem is presented in designing the system such that a power failure while a core element is being lifted will not result in the core element being dropped.

Another problem may arise in designing a core element handling system due to the fact that sometimes the core elements which are to be picked up are not in alignment with the penetration. These elements must therefore be moved into alignment with the penetration before they can be withdrawn therethrough. If the apparatus of the system jams before such alignment can be effected, it may be difficult or impossible to withdraw the core element.

It is desirable in a handling system that provision be made for remotely viewing the operations being carried on within the reactor vessel. Proper orientation of optical viewing apparatus may, however, require elaborate supports and aiming apparatus, and may require a separate reactor vessel penetration. These factors add complication and expense to the system.

Another problem that often arises in the design of a core element handling system is the fact that certain parts of the system apparatus, and particularly the apparatus used for moving the core elements through the penetration in the reactor vessel, may require repair. Naturally, personnel working on such repairs must be properly shielded from radiation. Such shielding on the apparatus may make it extremely heavy, particularly when the apparatus is used to temporarily store radioactive core elements. Generally, the larger and heavier the apparatus, the greater the cost and size of the crane or corresponding device which is used to move the apparatus between its operating position and its storage position.

One advantageous form of core construction, for certain applications, is that in which the core elements are in block form, and the core is comprised of a plurality of adjacent columns of such blocks. Although not limited to such a core construction, the handling system of the invention is particularly adapted for loading and unloading core elements from such a core. Naturally, to simplify the design of the system apparatus, it is desirable that an easy method be devised for unloading this type of core. It is desirable also that the apparatus of the system be reliable and be capable of being accurately controlled.

It is an object of this invention to provide an improved core element handling system for a nuclear reactor.

Another object of the invention is to provide a core element handling system which requires no additional reactor vessel penetrations other than those existing for purposes other than core element handling, and where guidance of the various devices of the system is facilitated.

Still another object of the invention is to provide an improved core element handling system wherein the complexity and cost over heretofore known systems for comparable types of reactors are reduced.

A further object of the invention is to provide an improved core element handling system in which problems of binding or jamming of certain devices therein are avoided or easily overcome.

A still further object of the invention is to provide a core element handling system and an improved grapple head therefor which avoids the danger of dropping a core element in the event of a power failure.

A still further object of the invention is to provide a core element handling system wherein viewing of the internal operations in a reactor vessel is facilitated at minimum cost and complexity.

Another object of the invention is to provide an improved core element handling system wherein repair is facilitated and weight is reduced.

A further object of the invention is to provide a core element handling system of improved reliability and control.

Still another object of the invention is to provide an unloading method for a nuclear reactor core comprised of a plurality of columns of individual stacked core blocks, which method simplifies the design of a core block handling system.

Other objects of the invention will become apparent to those skilled in the art from the following description, taken in connection with the accompanying drawings wherein:

FIGURE 1 is a full section side view of a handling machine used in the system of the invention, and illustrating a portion of a reactor vessel having a penetration therein;

FIGURE 2 is an enlarged top view of the handling machine of FIGURE 1;

FIGURE 2 is an enlarged sectional view illustrating a portion of the handling machine of FIGURE 1, a portion of a reactor vessel having a penetration, and a portion of a reactor core therein;

FIGURE 4 is an enlarged fragmentary view of a portion of the items shown in FIGURE 3;

FIGURE 5 is a full section view of an auxiliary transfer cask used in the system of the invention, and illustrating a control rod and drive assembly supported therein;

FIGURE 6 is a greatly enlarged sectional view of the telescoping tube section of a lifting assembly in fully telescoped condition, which assembly forms a part of the handling machine illustrated in FIGURES 1 and 2;

FIGURE 7 is a sectional view, with part broken away, illustrating the apparatus of FIGURE 6 in fully extended condition;

FIGURE 11 is an elevational fragmentary view illustrating the support system for a grapple head, both the support system and the grapple head being part of the lifting assembly of the handling machine;

FIGURE 12 is an elevational view of the apparatus of FIGURE 11, illustrating an alternative position therefor and viewed from a quadrant rotated 90° from that of FIGURE 11;

FIGURE 13 is a sectional view of part of the lifting assembly showing the grapple head control elements contained within the inner one of the telescoping tubes illustrated in FIGURES 6 and 7;

FIGURE 14 is a sectional view taken along the line 14—14 of FIGURE 13;

FIGURE 15 is an enlarged sectional view of the grapple head used in the machine of FIGURES 1 and 2 and illustrating a core element secured thereto;

Figure 8:
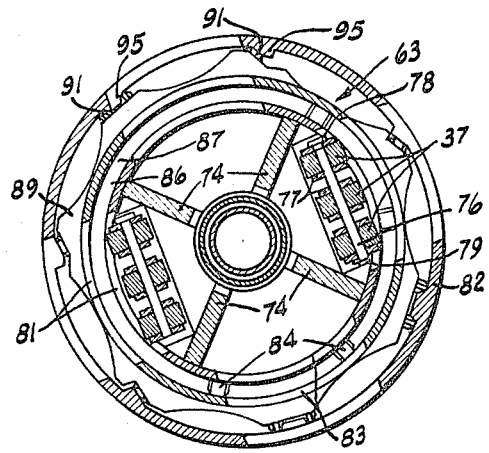
FIGURE 8 is a sectional view taken along the line 8—8 of FIGURE 6.
Figure 9:
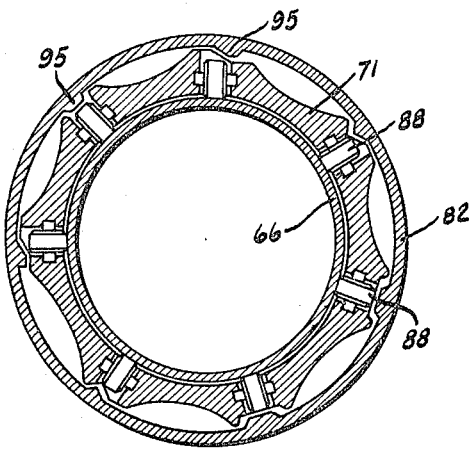
FIGURE 9 is a sectional view taken along the line 9—9 of FIGURE 6.
Figure 10:
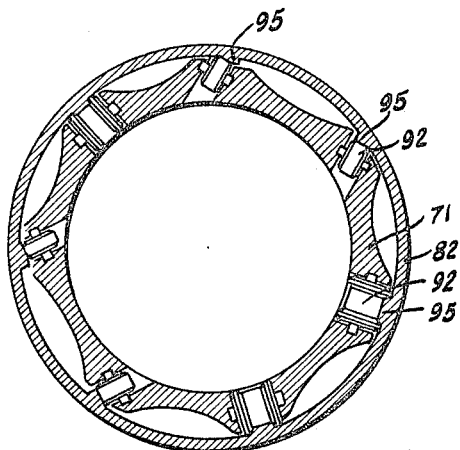
FIGURE 10 is a sectional view taken along the line 10—10 of FIGURE 6.

Very generally (see FIGURES 1–5), the invention constitutes a core element handling system for a nuclear reactor of the type which comprises a plurality of removable core elements 12 forming a core and a reactor vessel 11 enclosing the core and having at least one penetration 14 therein. The system includes a sleeve 49 adapted to fit within the penetration and means 54 for inserting and removing the sleeve in and from the penetration. The system further includes a handling machine 18 adapted to be positioned over the penetration. The handling machine has a lifting assembly 25 adapted to pass through the sleeve. The lifting assembly carries a pickup device or grapple head 35 which may be releasably attached to the removable elements of the core for transporting such elements through the penetration. The sleeve is adapted to guide the pickup device as it passes through the penetration.

In addition, the lifting assembly 25 of the invention (see FIGURES 6–14) includes a telescoping section 63 which is expandable within the penetration to effect guidance of the assembly and still reach the core elements. A pneumatic device 93, 97 is actuable to expand the telescoping section. The lifting assembly supports the grapple head 35 by a link 108 to which an actuator arm 106 is attached. The latter has at least a portion which may be melted to disable the arm in the event the arm jams in a position where passage of the grapple head through the penetration is prevented.

The invention also includes the grapple head 35 (FIGURES 15 and 16), which has a grapple 199 operable between a first condition wherein it is adapted to be disengaged from a core element and a second condition wherein it is adapted to be engaged with a core element. The grapple further includes an actuator member 183 which is movable between a first position wherein the grapple is in the first condition to a second position wherein the grapple is in the second condition (as in FIGURE 15). A spring 193 biases the actuator member toward the second position. The grapple further includes pneumatic means 187, 192 for displacing the actuator member to the first position.

Very generally, the method of the invention is for transporting at least part of a reactive core in a reactor vessel through a penetration therein, wherein the reactive core (see FIGURES 3 and 17) is comprised of a plurality of adjacent columns of separable core blocks 12, each core block being of a size to pass through such penetration. The method comprises transporting the core blocks through the penetration in an order such that all of the core blocks at a given level in a plurality of adjacent columns are transported before transporting the blocks in the next adjacent level.

I. THE CORE ELEMENT HANDLING SYSTEM

A. The reactor construction

Referring now more particularly to the drawings, the core element handling system of the invention is shown used in connection with a nuclear reactor having a prestressed concrete reactor vessel 11 which encloses a reactive core. The reactive core (FIGURE 3) consists of a plurality of core elements 12 which are of hexagonal cross section and which are stacked upon a supporting floor 13 to form a plurality of adjacent columns of separable core elements. The reactor vessel 11 is provided with a plurality of penetrations 14 therein, each of which is adapted to accommodate a control rod and drive assembly 53, as is more fully explained below. The core elements may be of any suitable composition in order to constitute a core of the desired nuclear characteristics. Such core elements may include moderating material, fertile material, fissile material, reflector material, or combinations of some or all of these.

As will be explained, during refuelling the control rod and drive assembly 53 is removed from one of the penetrations 14 and the individual core elements 12 are passed through the penetration. The block type construction, illustrated in FIGURE 3, minimizes the required headroom within the reactor vessel when it is necessary to move the blocks into alignment with the penetration through which they are being removed. Nevertheless, the system of the invention is not limited to a core having such a construction, but is applicable to many other types of cores having removable core elements, as will be apparent to those skilled in the art from the following description. The interior of the reactor vessel 11 is provided with an alloy steel liner 16. This liner is continued out through each of the penetrations 14 to terminate in an annular flange 17 which projects above the top surface of the reactor vessel 11.

B. The handling machine

The core element handling system of the invention includes a handling machine 18, illustrated in FIGURES 1 and 2, which is adapted to be moved, by suitable means, not shown (such as an overhead crane) to a position over one of the penetrations 14. In refuelling operations, the handling machine 18 performs the function of grasping and lifting certain core elements 12 within the reactor vessel 11, withdrawing such elements through the penetration 14 over which the machine is positioned, and temporarily storing the core elements within a shielded area until the handling machine is moved over a storage well. Upon positioning of the handling machine over a storage well, not illustrated, the core elements may be placed in the well for storage or disposal. The machine is then moved to a further unillustrated storage well wherein fresh core elements are stored. The machine grasps the fresh core elements in the well, temporarily stores them until the machine can be placed once again over a penetration in the reactor vessel, and then passes the core elements through the penetration and places them in the desired position within the reactor vessel.

In FIGURES 1 and 2, the handling machine may be seen as comprising a central housing consisting of a lower hollow section 19 and an upper hollow section 21. The lower section and the upper section are both formed of thick walls of shielding material to afford desirable biological shielding for the region surrounding the machine. The lower end of the lower section 19 is closed by a plate 22, and a slotted guide tube 23 is mounted over an opening 24 in the plate 22 and extends upwardly therefrom within the lower hollow section 19. The opening 24 and the guide tube 23 are aligned with a cylindrical liner 82 in the interior of the upper section 21. The annular compartmented region 26 surrounding the tube 23 between the tube and the inner surface of the lower section 19 is utilized as a storage area for the core elements 12.

The outer side of the upper section 21, about midway between its ends, is provided with three radially projecting arms 27. Suitable lifting points 28 for the crane or similar apparatus utilized to move the handling machine 18 are secured to the ends of the arms 27.

At the upper end of the upper section 21, an annular disc 29 is provided, supported on four triangular vertical webs 31 attached to the upper section. A housing for containing a hoist mechanism is supported on the disc 29. The housing consists of a lower floor 32, a top 33, and suitable side walls 34, formed generally in the shape of a cross having four arms of equal length (see FIGURE 2). A plurality of drive and idler sprockets 36 and suitable drive motors therefor, not shown, are contained within the housing. The function of these latter items is to control and move hoisting chains 37 which raise and lower the lifting assembly of the machine, described subsequently. The electrical and pneumatic lines for operating the various items of equipment within the lifting assembly, explained subsequently, are moved by pulleys (not shown) contained within the other two of the four arms of the cross-shaped housing. Four downwardly extending tubes 38 communicate through openings 39 with the interior of the cross shaped housing and accommodate pulley type counterweights 41 which take up slack in the hoisting chains 37 and in the pneumatic and electrical lines and cables, not shown, and provide a downward force thereon.

The lifting assembly 25 may be lowered from a position in the upper section 21 (FIGURE 1) to a position in the penetration (FIGURE 3). In FIGURES 1 and 3, the means for supporting the grapple head are shown schematically by a dotted line for clarity. Such means are explained in detail below.

The lower end of the handling machine 18 carries a valve 42 having a movable lead slug 43 therein for selectively opening and blocking a central passage in the valve. The slug 43 provides biological shielding for the regions exteriorly of the handling machine as the handing machine is being moved, and carries suitable means, not shown, for effecting a gas-tight seal at the central passage in the valve 42.

In addition to the handling machine valve 42, a similar valve 44, having a movable lead slug 46, is placed over the penetration 14 before placing the machine 18 in the illustrated position. The function of these valves will be explained subsequently. The movable slug 46 in the valve 44 provides both biological shielding and gas-tight sealing of the central opening in the valve 44.

It will be appreciated that the required shielding and various other structural items for the handling machine 18 add substantial weight to the machine. Any minimization of such weight on the machine affords a direct cost saving in that the capacity of the lifting crane or similar mechanism for transporting the machine may not be as great. In order to shield personnel working on the hoist mechanism at the top of the machine, a removable repair platform is provided. The platform consists of a floor 47 which is shaped to fit around the cross-shaped housing and be supported on the lower floor 32 thereof which projects a short distance beyond the side walls 34 at the tips of the cross arms of the housing. The floor 47 is made sufficiently thick to afford adequate shielding to personnel walking on the platform, such shielding being particularly desirable when radioactive core elements are stored within the handling machine. A safety railing structure 48 is provided extending around the platform. When the platform is not in use, it may be removed from the top of the machine and stored in a suitable location. Accordingly, the weight of the platform is not added to the handling machine when the handling machine is being moved to its various locations in the system. Moreover, the shielding required in the handling machine need not be as thick as it would have to be if platform shielding were not provided for personnel.

C. The guide sleeve

As previously mentioned, the handling machine includes a lifting assembly 25 which is lowered into the concrete reactor vessel 11 to engage and pick up the core elements therein. The specific nature and design of the lifting assembly is set forth subsequently. For reasons which are explained subsequently, it is desirable that the assembly be accurately guided and positioned as it is lowered into the reactor vessel. This is accomplished by means of a guide sleeve 49 which is inserted in the penetration 14 after the control rod and drive assembly has been removed therefrom, explained below. The sleeve 49 has an annular shoulder 51 extending outwardly thereof near the top of the sleeve. A corresponding annular shoulder 52 is provided in the liner 16 in the penetration 14 and provides axial support for the sleeve in the penetration.

The sleeve 49 may be secured in the penetration by suitable spring engaged locking lugs, not illustrated, and may be located therein by a keying arrangement, also not illustrated. As will be explained below, the inner surface of the sleeve 49 is designed for proper guidance of the lifting apparatus. To assure proper sealing of the penetration, a sealing ring 40 is bolted onto flange 17 (as shown in FIGURE 4). The sealing ring 40 is suitably sealed to the flange 17 and to a projection 50 of the isolation valve 44, and acts to eliminate reactor coolant leakage. This sealing arrangement accommodates height tolerances in the penetration. The space above the reactor vessel 11 and between the various flanges 17 is filled with granular shielding material 55 and covered by plate 45.

D. The auxiliary transfer cask

The guide sleeve 49 and the control rod and drive assembly 53 are inserted and removed from the penetration 14 by means of an auxiliary transfer cask 54, illustrated in FIGURE 5. The auxiliary transfer cask includes a main tubular shielded housing 56 having a suitable hoist mechanism enclosed within an upper housing 57. The control rod and drive assembly 53, including a pair of control rods 58 suspended therefrom, is shown contained and suspended within the auxiliary transfer cask 54 in the housing 56 thereof. The lower end of the main housing 56 includes an outwardly extending annular flange 59 to which a lower valve 61 is bolted. The valve 61 includes a movable slug 62 which effects biological shielding and gas-tight sealing of the passage within the valve.

The auxiliary transfer cask is for the purpose of removing the control rod and drive assembly 53 from the particular one of the penetrations 14 which is to be used for refuelling. Before doing so, the isolation valve 44 is placed over the penetration and bolted in place, by suitable means, not shown. The auxiliary transfer cask is then moved by a crane or similar apparatus to a storage well for the control rod and drive assembly. After depositing the control rod and drive assembly in the storage well, the transfer cask 54 is moved to a storage well for the guide sleeve 49 and the guide sleeve is removed from the storage well. The auxiliary transfer cask is then moved over the penetration 14 which is to be used for refuelling, and the interspace between the valve 61 and the isolation valve 44 is purged of contaminants. In the case of a gas-cooled reactor, it is preferred that the purge be accomplished by a gas which is the same gas as is utilized for the coolant. The valves 44 and 61 are then opened and the liner is lowered into place resting upon the shoulder 52 and engaged by the previously mentioned spring engaged locking lugs. The valves 44 and 61 are then closed once again, the interspace purged and vented, and the auxiliary transfer cask 54 returned to a suitable storage area or to a position for another task.

E. The lifting assembly

Once the guide sleeve 49 is in place within the penetration 14, the handling machine 18 is placed in position over the isolation valve 44 in the position shown in FIGURE 1. The interspace between the two valves 44 and 42 is purged, and the valves 42 and 44 are then opened. At this point, the lifting assembly 25 is lowered by the hoisting mechanism of the handling machine 18 through the penetration 14.

The lifting assembly 25 includes a telescoping section 63 which will be described in greater detail subsequently. The section 63 is generally cylindrical in shape and has means on its outer surface for being guided within the liner 82 in the upper portion 21 of the main housing of the handling machine 18. Guidance is also afforded to the telescoping section 63 by means of the guide tube 23 and by means of the sleeve 49. The inner surfaces of the liner, the guide tube and the sleeve are identical and serve to maintain the telescoping section with the equipment contained therein in suitable orientation during its passage through the handling machine 18 and the penetration 14. The lower end of the liner in the upper housing 21 and the upper end of the guide tube 23 are spaced from each other a sufficient distance to enable core elements to be passed into the compartmented annular region 26 surrounding the tube 23 for storage therein. A mechanism for accomplishing this will be described subsequently. Suitable slots are provided in the tube 23 to permit such mechanism to move to the bottom of the annular region. As a result of the alignment of the liner in the upper section 21, the guide tube 23, and the sleeve 49, and as a result of their axial spacing, positive and sure guidance is provided for the telescoping section 63 (and the apparatus contained there) from its storage position within the upper portion 21 to its operating position within the penetration 14, explained subsequently.

The telescoping section 63 of the lifting assembly 25 is illustrated more fully in FIGURES 6 and 7, the former showing it in its fully telescoped condition within the liner 82 and the latter showing it in its fully extended condition within the sleeve 49. Both FIGURES 6 and 7 are offset sectional views to show more of the device, and reference to FIGURES 8–10 will provide a more accurate conception of the cross sectional position of the various parts. The telescoping section 63 includes an outer tube 64 and an inner tube 66 which are coaxial throughout substantially their entire lengths in the fully telescoped condition shown in FIGURE 6. The outer tube 66 is closed at one end by an end plate 67 which is attached to the tube. Similarly, the inner tube 66 has an end plate 68 secured to one end and closing same. In the fully telescoped condition, the plates 68 and 67 abut each other. The end of the outer tube 64 opposite the plate 67 is provided with a threaded annular section 69 in which a stop ring 71 is threaded. The inner diameter of the stop ring 71 is less than the inner diameter of the outer tube 64. The inner tube 66 carries a plate 72 intermediate its ends, which plate extends beyond the outer diameter of the inner tube 66 to form an annular shoulder thereabout. In the fully extended condition, the annular shoulder formed by the plate 72 engages the upper edge of the stop ring 71 to prevent further movement of the inner tube 66 with respect to the outer tube 64.

In raising and lowering the telescoping section 63 by means of the hoist mechanism in the top part of the handling machine 18, the inner tube 66 is carried by the hoisting chains 37, and the outer tube 64 is slidably supported on and carried by the inner tube. Suitable openings, not shown, are provided in the plates 67 and 68 to permit the hoisting chains to pass through the plates. In FIGURE 8, the means for attaching the inner tube 66 to the hoisting chains 37 may be seen. A plate 73 extends transversely of the inner tube 66. Four vertical webs 74 extend between the plate 73 and the end plate 68 to form a rigid assembly. As may be seen from FIGURE 8, three hoisting chains 37 are used on each side of the plate 73. The links of the chains 37 are attached to a rod 76 which is supported on the plate 73 by a plurality of brackets 77 extending upwardly from the plate. The rod 76 is secured in the bracket 77 by means of a head 78 on one end of the rod and a lock washer 79 at the opposite end of the rod.

Vertically extending slots 81 are provided in the upper ends of inner tube 66, the outer tube 64, and the liner 82 in the top portion of the handling machine housing in order to permit clearance of the chains 37 and the sprockets 36 when the telescoping section 63 is at the uppermost limit of its travel (shown in FIGURE 1). The pneumatic and electrical lines to the grappling apparatus contained within the inner tube 66, explained below, are accommodated by similar vertical slots 83 provided in the upper ends of the inner tube 66, the outer tube 64 and the liner 82.

In order to space the inner tube 66 from the outer tube 64, the inner tube is provided (at the plate 73) with a plurality of wheels 84 which ride against the inner surface of the outer tube 64. The plate 68 carries a plurality of wheels 85 which are identical in configuration and orientation to the wheels 84 and are for the same purpose. The inner tube 66 and the outer tube 64 are maintained in a fixed circumferential relationship by means of two wheels 86 which are positioned one above the other and which extend from the inner tube 66. The wheels 86 ride on respective mutually perpendicular vertical surfaces in a vertical guide track 87 extending inwardly from the inner surface of the outer tube 64. In addition to the wheels 84 and the wheels 86 near the plate 73, provision is made at the lower end of the inner tube 66 for maintaining radial spacing from the outer tube 64. This spacing is accomplished at the lower end by a plurality of wheels 88 extending inwardly from the stop ring 71 to engage the outer surface of the inner tube 66.

As previously mentioned, the telescoping section 63 passes downwardly through the liner 82, the guide tube 23, and the guide sleeve 49. The inner guiding surfaces of the latter three items are identical and hence the inner surface of only the liner 82 is shown and described in detail. It is to be understood that cooperation between the elements on the outer tube 64 and the inner surfaces of the three items is the same. The outer tube 64 has a plurality of annular flanges 89 spaced axially along its length. These flanges have a plurality of wheels 91 mounted therein at circumferentially spaced intervals. These wheels engage vertical tracks 95 formed in the inner surface of the liner to maintain a desired radial spacing and circumferential orientation of the outer tube 64 with respect to the liner. Some of the wheels, as may be seen from FIGURE 8, are flanged and other wheels are disposed at an angle with respect to a radius of the inner tube, to eliminate circumferential movement and to maintain proper orientation throughout the travel of the telescoping section. The plate 67 is provided with a plurality of wheels 90 of the same configuration and orientation as the wheels 91. The stop ring 71 carries a plurality of wheels 92 which are identical with the wheels 91 in spacing and orientation and serve to space and orient the outer tube 64 at its lower end. It is to be understood that although the particular illustrated ararngement and configuration of the wheels 91 and 92 and the tracks 95 may provide certain advantages in construction, assembly and clearance, other wheel arrangements may be employed without departing from the spirit and scope of the invention.

Positive control over the relative axial position of the outer and inner tubes 64 and 66, respectively, is afforded by means of a pneumatic device located centrally of the inner tube near one end thereof. The pneumatic device comprises a hollow tubular piston 93 which passes through an opening in the plate 68 aligned with the piston. The piston 93 is secured in the plate 67 by means of a ball type coupling 94 which permits the piston a slight degree of play with respect to the plate 67. This reduces the likelihood of binding at the point where the piston 93 is connected to the plate 67. The piston 93 is closed by an end cap 96 and is axially movable within a pneumatic cylinder 97, the latter being closed by an end cap 98. Suitable conduits, not shown, are provided for conducting a controlled amount of gas into the pneumatic cylinder 97 to cause displacement of the piston 93 therein.

As the inner tube 66 is lowered on the chains 37 within the guide liner 82, the outer tube 64 is maintained in its uppermost position against a suitable stop, not shown. This is done by maintaining a suitable pressure in the pneumatic device. Upon reaching the fully extended condition, shown in FIGURE 7, the outer tube moves with the inner tube. In the position seen in FIGURE 3, the inner tube 66 extends downwardly into the reactor vessel, whereas the outer tube 64 remains within the sleeve 49 so that the lifting apparatus carried by the inner tube 66 will be accurately located. When the lifting assembly 25 is to be withdrawn, the hoist is actuated and the inner tube 66 is drawn upwardly. As the lifting assembly reaches its highest position at the upper end of the liner 82, the pressure within the cylinder 97 may be relieved to permit the tubes 64 and 66 to once again move to their fully telescoped condition. The fact that the tubes 64 and 66 are biased toward their fully extended condition by pneumatic pressure insures a long guide surface as the lifting assembly passes through the liner 82, the tube 23 and the sleeve 49. Moreover, the slight resilience afforded by the pneumatic pressure helps to prevent binding of the lifting assembly in the guiding elements.

The lower end of the inner tube 66, as previously mentioned, carries and supports the grapple head 35 which attaches to the core elements. Referring to FIGURES 11 and 12, the means which support and position the grapple head may be seen. A cylinder 99 is mounted coaxial with the inner tube 66 at the lower end thereof. The lower end of the cylinder 99 has a plate 101 bolted thereto and is journalled by an annular bearing 102 in a suitable recess at the lower end of the inner tube 66. The plate 101 has a slot 104 through which an actuator arm 106 passes. The arm 106 is for operating the grapple head support arms, as are explained in detail subsequently. Operation of the actuator arm is accomplished by a mechanism which will also be described subsequently.

A pair of support brackets 107 extend downwardly from the plate 101 and are rigidly secured thereto. A pair of grapple head support arms or links 108 are pivotally secured by pivot pins 109 to the brackets 107 at a point approximately one-third of the distance from the upper end of the support arms 108. The actuator arm 106 is pivotally secured by a pivot pin 111 to the ends of the support arms 108. The ends of the support arms opposite the pin 111 are attached by pins 112 to mounting brackets 113 extending upwardly from the top of the grapple head. In response to downward and upward movement of the actuator arm 106, the arms 108 pivot about the pivot pins 109 to swing the pivot pins 112 through an arc, the center of which is at the pins 109. This moves the grapple head between a position aligned and directly underneath the inner tube 66 and a position displaced therefrom a distance equal to the distance between the pins 109 and the pins 112. FIGURES 11 and 12 illustrate two different positions of the grapple head between the extremes of its movement.

In order to maintain the grapple head in a vertical orientation throughout its arcuate swing, a pair of parallel links 114 are pivotally secured to the brackets 107 by pins 116 and are pivotally secured by pins 117 to the grapple head, extending into a recess therein. The grapple head can also be moved through an arc, the center of which lies on the axis of the cylinder 99, by rotating the cylinder by means which will be subsequently explained.

In the event some difficulty arises within the reactor vessel 11, such as in the case of a broken core element, it is frequently desirable that means be provided which enable an operator to view the interior of the reactor vessel. A television camera is sometimes employed for this purpose. The handling system of the invention utilizes a television camera 118 for this purpose in such a manner that the television camera may be readily aimed at various locations within the reactor vessel. The need for additional support and control mechanisms for this and the need for a separate penetration in the reactor vessel for the television viewing equipment is obviated by mounting the television camera 118 on a web 115 which extends between the two arms 108, the camera is thereby aimed according to the attitude of the arms. Thus the direction in which the television camera 118 is aimed will be controlled by controlling the actuator arm 106. A mirror 119 is utilized, also mounted and supported on the web 115 between the two arms 108 to deflect the image which the television camera sees through 90°. This enables the elongated cathode ray tube within the television camera to be disposed along the length of the arms 108 such that it does not project outside of the arms and create interference problems. A light source 121 is also provided mounted on the web 115 between the arms 108 to illuminate the area at which the television camera 118 is aimed through the mirror 119.

Referring now to FIGURES 13 and 14, the means by which the actuator arm 106 is controlled and moved may be seen. These means include an upper plate 122 which is bolted to the upper edge of the cylinder 99. The plate is journalled in an annular bearing 123 which fits into a corresponding annular recess in the plate and is supported in suitably shaped annular recesses in a pair of inwardly extending annular flanges 124 on the inner tube 66. The inner tube 66 is separable at the flanges 124 for assembly purposes and is bolted together at the flanges.

The plate 122 is provided with a central opening and carries a threaded insert 126 which is journalled in the central opening by a pair of spaced annular bearings 127. A sleeve 128 having an outwardly turned flange 129 is bolted to the top of the threaded insert 126 and operates to turn the insert with respect to the plate 122. Rotary power for turning the sleeve 128 is supplied from a drive motor 131 having a drive shaft 132 attached to the top end of the sleeve 128 by a suitable welded cap 133. It is preferred that the motor 131 be a step motor in order to provide very accurate control over the position of the actuator arm 106.

Positioning of the actuator arm by the motor 131 is accomplished by means of a screw 134 which is disposed centrally of the sleeve 128 and is in threaded engagement with the threaded insert 126. Upon rotation of the sleeve 128 and the insert 126, the screw 134 is moved axially with respect to the plate 122. The lower end of the screw 134 below the plate 122 is fixed in a sliding support 136 for the actuator arm 106 by suitable means, not shown. Axial thrust is received by the sliding support 136 through an annular shoulder 138 in a corresponding recess in the top of the sliding support. The sliding support 136 will thereby move up and down with respect to the plate 122 in response to axial movement of the screw 134.

The sliding support 136 is provided with a central open space 139, and a support pin 141 for the actuator arm 106 extends across the space 139. The actuator arm 106 is pivotally secured at one end on the support pin 141 by means of a bushing 142. Guidance for the sliding support 136 is provided by a pair of guide posts 143 which extend downwardly from the plate 122, being fixed therein. The lower end of the guide posts 143, as may be seen in FIGURE 11, are fixed in a raised portion 144 in the lower plate 101. The guide posts are hollow and extend through openings 146 in the sliding support 136. Vertical chamfers 147 are provided at two corners of the sliding support 136 adjacent the cylinder 99 for clearance.

As the screw 134 is moved up and down by the motor 131, the sliding support 136 is correspondingly moved up and down on the guide posts 143. This will move the actuator arm 106, causing it to displace the pivot pin 111 and consequently pivot the arms 108 about the pivot pins 109. This will thereby effect a change in the position of the grapple head. The open slot 104 in the plate 101 provides clearance for the actuator arm 106 to swing as it moves the arms 108. This may be seen by comparing FIGURE 11 with FIGURE 12.

As previously mentioned, the cylinder 99 may be rotated in order to move the grapple head in an arcuate path about the axis of the cylinder. This fact, coupled with the movement afforded by the actuator arm 106, provides a universal type of positioning movement for the grapple head. Rotation of the cylinder 99 is effected by rotating the upper plate 122. Such rotation is accomplished through a sleeve 148 which has an outwardly turned annular flange 149 at its lower end bolted to the top of the plate 122. The upper end of the sleeve 148 is provided with an outwardly turned flange 151 which is bolted against the underside of a support plate 152 for the motor 131. A cylinder 153 is bolted at its lower edge to the plate 152 and extends upwardly therefrom to enclose the motor 131. A top plate 154 is welded across the top of the cylinder 153 and has a cylinder 156 bolted thereto through an inwardly turned annular flange 157 on the cylinder 156. The upper end of the cylinder 156 is provided with an outwardly turned flange 158 upon which a ring gear 159 is bolted. The outer periphery of the ring gear 159 is journalled by means of an annular bearing 162 in a flange 161 inwardly extending from the inner tube 66.

A gear train supporting plate 163 is accommodated by a suitable recess in the top of the flange 161 and by a similar recess in a second flange 164 also extending inwardly from the inner tube 66. The inner tube is separable between the two flanges 161 and 164 for assembly purposes and is bolted together at such flanges. An idler gear 166 is supported on an idler shaft 167 fastened in the support plate 163. The idler gear 166 is in engagement with the gear teeth on the inner periphery of the ring gear 159 and is driven by a pinion gear 168. The pinion gear 168 is fixed on the end of a drive shaft 169 which extends through a central opening in the plate 163 and is journalled therein by an annular bearing 171. The drive shaft 169 is driven by a motor 172. The motor 172 is supported on a motor support plate 173 having an upwardly turned annular flange 174 bolted to the inner wall of the inner tube 66. A suitable central opening is provided in the plate 173 for accommodating the drive shaft 169.

As the motor 172 is actuated, rotation of the drive shaft 169 will turn the ring gear 159 through the gears 168 and 166. This will turn the cylinder 156 and the cylinder 153, thereby turning the sleeve 148. The sleeve 148, being bolted to the plate 122, turns the plate and, accordingly, the cylinder 99 and the plate 101 are rotated. The motor 131, the sleeve 128, the insert 126 and the screw 134 all turn as a unit with the sliding support 136 and the guide post 143. This means that no relative movement between the screw 134 and the threaded insert 126 will occur, and consequently no movement of the actuator arm 106, other than rotational movement, will occur. It is preferred that the motor 172 be a step motor in order to accurately position the lifting apparatus rotationally. Proper control of the two motors, 131 and 172, can precisely position the grapple head 35 as desired.

A power failure or other malfunction of the apparatus which moves the actuator arm 106 may result in a condition wherein the grapple head is suspended in a position, such as in FIGURE 11, where it is unaligned with the inner tube 66. If it were not possible to move the grapple head back to an aligned position, withdrawal of the grapple head from the reactor vessel may be prevented. To alleviate such a situation, the actuator arm 106 is provided with a segment 176 which is comprised of a different material from the remainder of the actuator arm. The material of the segment 176 is selected to be meltable at a temperature which exceeds the coolant temperature within the reactor vessel and which is substantially lower than the melting point of the materials of which the other elements of the lifting apparatus are constructed. A heating coil 177 is positioned about the segment 176, being supported by means not illustrated. In the event of a malfunction, sufficient current is passed through the heating coil 177 by means not shown to cause the segment 176 to melt. This disables the actuator arm 106 and permits the arms 108 to swing downwardly due to the force of gravity until the grapple head 35 is directly beneath and is aligned with the inner tube 66.

As an alternative to the arrangement just described, the entire actuator arm 106 may be made of such meltable material or one or more of its pivotal pin connections may be comprised of such meltable material. In the claims, the term actuator arm is intended to include any connections for the arm as well as the arm itself. The need for a heating coil may be dispensed with by constructing the meltable segment or other meltable portions of the arm of a material which may be melted by raising the coolant temperature of the reactor within the reactor vessel by a sufficient amount. In any event, the actuator arm will be disabled to permit the grapple head to swing down to a retractable position. By way of example, in a gas cooled nuclear reactor wherein the coolant temperature at the top of the core during handling operations is approximately 250° F., a 700° F. melting temperature would be satisfactory. The temperature at the top of the core may typically be raised to such a temperature by decreasing the rate of coolant flow.

F. The grapple head

Figure 16:
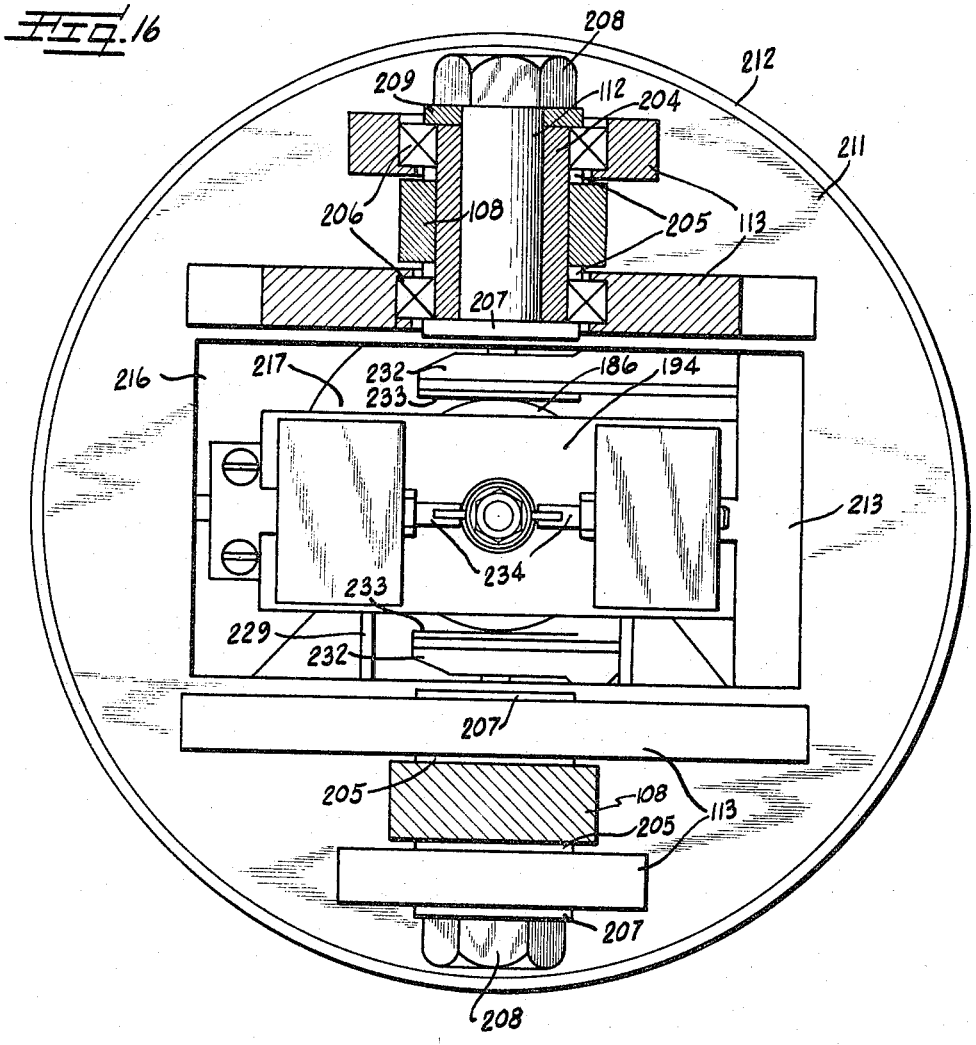
FIGURE 16 is a top plan view of the grapple head of FIGURE 15.

Referring now to FIGURES 15 and 16, the details of the grapple head 35 are shown. The function of the grapple head is to engage and attach to the core elements within the reactor vessel in order that they may be withdrawn with the grapple head, one at a time, through the penetration 14. Each of the core elements (the core blocks 12 in the illustrated reactor) is provided with a central hole 178 which is closed at its lower end by a plug 179. An annular shoulder 181 is disposed between the ends of the hole, and an annular tapered section 182 is formed in the hole just above the shoulder 181. The shoulder is engaged by the grasping elements or grapple, explained below, and lifted with the grapple head.

A spine 183 depends from the grapple head and carries the grasping elements or grapple, described below. The tip of the spine is provided with a conical probe 184 which cooperates with the tapered section 182 of the hole 178 to aid in guiding the spine 183 to a centered position within the hole by means of a sensing arrangement, described subsequently. The upper section 186 of the spine is of larger diameter than the lower section and extends into a central chamber within a pneumatic cylinder 187. The interior of the cylinder is divided into an upper chamber 188 and a lower chamber 189 of slightly smaller diameter. A seal 191 seals the upper section 186 of the spine to the walls of the lower chamber 189. The upper section 186 carries a piston 192 disposed in the chamber 188 and which is sealed to the walls of the chamber by a seal arrangement about the periphery of the piston.

The grapple, which will be explained, is biased into a condition wherein it is expanded for engagement with a core element by a pair of coil springs 193. The springs urge the piston 192 downwardly against the lower end of the chamber 188. Two springs are used for redundancy in order to increase the reliability of the device. An upper plate 194 is bolted to the cylinder 187 at the top end thereof and carries a plug portion 196 which projects downwardly into the cylinder 187 and seals the cylinder at the top end. A cylindrical extension of the plug portion 196 acts as an upper stop for the piston 192. The upper portion 186 of the spine projects upwardly through an opening in the plate 194 and is sealed therein but is free to move axially in the opening. A passage 197 communicates with the upper chamber 188 below the piston 192. The grapple is moved to a disengaged position by forcing a gas into the upper chamber and displacing the piston upwardly against the bias of the springs 193. The seal 191 prevents the escape of any gas thus forced into the cylinder downwardly through the chamber 189.

The lower end of the cylinder 187 is provided with a downwardly extending tubular portion 198, and the spine 183 extends through this portion. A plurality of fingers 199, which form the grapple, depend from the tapered end of the tubular section 198 and are arrayed radially about the spine. Each of the fingers 199 is provided with a shoulder 201 thereon, and the lower tip 202 of each finger is angled inwardly below the shoulder. The spine 183 carries a conical shoulder 203 located slightly above the probe 184 for actuating the grapple. As may be seen from FIGURE 15, with the piston 192 at the lower limit of its travel, the shoulder 203 engages the tips 202 of the fingers 199 to urge the fingers outwardly such that the shoulders 201 thereof extend under the annular shoulder 181 in the core element. When the grapple head is drawn upwardly, the core element will therefore be drawn with it.

Upon the introduction of pneumatic pressure underneath the piston 192, the piston is displaced upwardly against the bias of the springs 193 until the shoulder 203 no longer contacts the tips 202 of the fingers. The inner side of the probe 184 engages the outer sides of the tips 202 in order to displace the tips inwardly. Upon the tips being so displaced inwardly, the shoulders 201 will clear the annular shoulder 181 and permit the spine to be withdrawn from the hole 178. The fingers may be constructed of resilient material such that the tips 202 are biased inwardly against the spine.

In order to automatically correct the position of the grapple head to facilitate entry of the spine 183 into the hole 178, an arrangement of sensors is utilized in the grapple head which provides an error signal for automatic correction of head position. Downward travel of the grapple head may be arrested until any positioning errors are corrected, and then may be continued until stopped automatically, as will be explained. Once the spine is properly inserted, the pressure below the piston 192 may be relieved to permit the springs 193 to force the piston downwardly and cause the fingers to engage the core element. It will be noted that only by pneumatic pressure is the grapple held in the released condition, and that upon such pressure being relieved, the springs 193 will cause the grapple to quickly move into the engaged position. Because of this arrangement, a core element cannot be released without introducing pressure into the pneumatic cylinder. A manual emergency release may be incorporated in the core element handling machine. The sensing arrangement also provides a signal when the core element is properly engaged by the grapple and automatically causes the mechanism to lift the grapple head and the attached core element up through the penetration into the handling machine.

As previously described, the grapple head is supported on a pair of parallel support arms 108 from the rest of the lifting assembly. The pivot pins 112 which secure the support arms 108 to the brackets 113 on the top of the grapple head are surrounded by a bushing 204 journalled in the brackets 113 by annular bearings 206. One end of each pin is provided with a head 207 and the opposite end is threaded and a nut 208 secured thereon. A washer 209 is disposed between the nut 208 and the adjacent bearing 206. Spacer rings 205 are disposed between the bearings 206 and the arm 108. The brackets 113 extend upwardly from a top plate 211, which forms part of a housing for the sensing arrangement. A cylindrical wall 212 extends downwardly from the top plate 211, and a pair of horizontal plates 213 and 214 are disposed, respectively, near the middle of and at the lower edge of the cylinder 212. The upper plate 211 is provided with a rectangular opening 216 centrally thereof. The plates 213 and 214 are provided with circular openings 217 and 218, respectively.

The cylinder 187 is disposed to extend through the openings 216–218 and is therefore free to move laterally with respect to the plates 211, 213 and 214. Restraint is placed upon this lateral movement by a plurality of coil springs 219 attaches at one end to posts 221 extending from the plates 213 and 214. The opposite ends of the springs 219 are secured to posts 222 which, in turn, are mounted in a plate 223 extending from the cylinder 187. Tension is placed upon the springs 219 and the springs are distributed radially around the cylinder, such as at 90° intervals, in order to bias the cylinder toward the center of the openings 216, 217 and 218. Axial displacement of the cylinder with respect to the plates 211, 213 and 214 is presented by a plurality of balls 224 which are interposed in the center of each of the springs 219 in a suitable ball race to permit the balls to roll with respect to the springs. Thus, the balls will move between the plate 223 and the plates 213 and 214 to permit lateral displacement of the cylinder 187, but will prevent any vertical displacement thereof with respect to the plates.

The sensors which produce the error signal for positioning the spine 183 within the hole 178 are mounted on the top surface of the plate 213. The upper sensor 226 is attached by a rod 227 to a U-shaped yoke 228. The yoke is provided with wear pads 229 which engage the outer surface of the cylinder 187. The sensor 231 is located astride the central portion of a U-shaped yoke 232. The yoke 232 is provided with wear pads 233 thereon which engage the outer periphery of the cylinder 187 to sense movement thereof in the direction perpendicular to the direction of movements sensed by the yoke 228.

Axial movement of the spine 183 with respect to the cylinder 187 is sensed by two pairs of switches 234 and 236. The switches are in pairs for redundancy to increase reliability. The upper pair of switches 234 engage an annular projection 237 on the upper section 186 of the spine and provide an indication of the spine position with the piston 192 at the lower limit of its travel (the grapple engaged). The pair of switches 236 fall into an annular recess 238 on the upper section of the spine when the piston is at the upward limit of its travel (the grapple disengaged). Thus, an indication of when the grapple is engaged and disengaged will be provided.

In order to prevent rotational movement of the plates 211, 213 and 214 with respect to the cylinder 187, the lower plate 214 is coupled to the cylinder by means of a plurality of slide blocks 239 and a plate 241 which extends outwardly from the cylinder at the lower end thereof. Suitable keyed tracks 242 are provided in the lower plate 241 and a corresponding plurality of tracks are provided in the underside of the plate 214 extending perpendicularly of the tracks 242. The slide blocks 239 carry projections which extend into the respective tracks and are slidable therein. This arrangement permits the cylinder 187 to be laterally displaced with respect to the plates 211, 213 and 214, but prevents rotation of the cylinder with respect thereto.

A contact pad 243 is carried under the grapple head. The pad 243 is slidably carried on a plurality of posts 244 and 245 which depend from the plate 241 and are suitably distributed. The interior of the posts 244 includes a pair of coil springs 246 which bias the pad 243 downwardly against an annular stop 247 on the posts 245. In the event the grapple is inserted too far into the hole in the core element, the pad will yield such that the core element will not be damaged. As an added precaution, an overtravel switch 250 is released upon sufficient displacement of the pad 243 to cause the motors to stop further downward travel of the grapple head. A plurality of wheels 253 are mounted on the pad 243 at suitable intervals about the periphery thereof. The wheels are used to guide the grapple head and the attached core element, if any, by rolling on adjacent surfaces, such as the sides of adjacent core elements.

A sleeve 248 extends downwardly from the plate 241 surrounding the tubular portion 198 of the cylinder 187. The sleeve 248 is provided with an outwardly turned flange 249 at the lower end thereof which extends into a recess 251 in the pad 243. Suitable means are disposed in the chamber 251 in order to sense the downward force applied to the core element by the pad 243 and in order to sense the weight of the core element as it is being transported.

The sensing arrangement illustrated and described above will provide signals for a satisfactory automatic control system for the grapple as it picks up and deposits core elements. It is to be understood, however, that modifications may be made in the sensing arrangement, and that additional sensors may be provided in the event greater sensitivity or reliability is desired.

II. THE CORE ELEMENT HANDLING METHOD

A. The core construction

Figure 17:
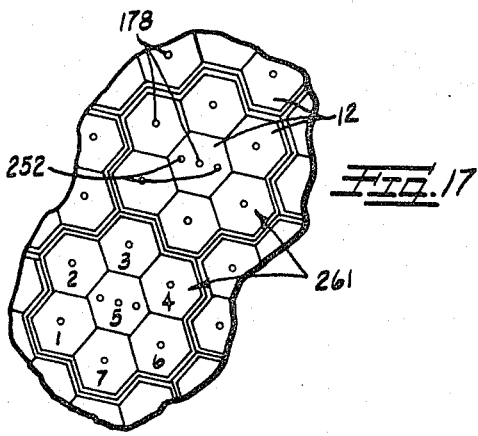
FIGURE 17 is a plan schematic view illustrating an arrangement of core elements of a type to which the method of the invention pertains.

Referring now to FIGURE 17, the method of loading and unloading a core in accordance with the invention will be described. The previously described apparatus has particular application to performing a method in accordance with the invention. In FIGURE 17, it will be seen that the core is comprised of a plurality of core elements 12, each provided with a central hole 178 to facilitate grasping thereof by a grapple. The core elements illustrated in FIGURE 17 are all hexagonally shaped graphite blocks which internally carry a plurality of pins, not shown, of fissile material. It is to be understood, however, that the core elements may be comprised of a reflecting or moderating material or some other similar construction and the method of the invention will have equal applicability to this type of core block.

The portion of the core illustrated in FIGURE 17 consists of a plurality of regions 261, delineated by the double lines, each comprised of seven vertical columns of individual core blocks 12. The core blocks in the central columns of each region include a pair of vertical passages 252 for accommodating control rods in order to vary the reactivity of the core. In addition, the blocks in each of the central columns in each region may be displaced downwardly with respect to the adjacent columns in order to inhibit lateral shear across the interfaces of the core blocks comprising the core. The penetration for containing the control rod and drive assembly is located immediately above the center column of each region and, as previously described, the loading and unloading of core blocks is effected through such penetrations.

B. The handling procedure

In accordance with the method of the invention, an entire region 261 is loaded or unloaded (transported) at one time through the penetrations above its center column before loading or unloading another region through another one of the penetrations. Each region is unloaded by removing all of the core blocks in the same layer, before moving to the next subjacent layer. Accordingly, if the view in FIGURE 17 is taken to represent the top of the core, unloading is accomplished in each region by first unloading the top block in the central column thereof, and then unloading the top block in each of the adjacent columns. After doing this, the second block from the top in the central column is unloaded, and then the second block from the top in each of the adjacent columns in the region are unloaded.

In loading the core blocks into the core, the core blocks in only four of the six side columns at each layer are placed before the core block in the central column at that layer is placed. By placing the proper core blocks, such as those numbered 1–4 in FIGURE 17, before placing the central core block 5, the central core block may be inserted from the side (i.e., passed between the core blocks 1 and 4) rather than the top, obviating the need for beveled corners on the lower edges of the central core blocks. Beveled corners would complicate nuclear design of the central core blocks and increase fabrication costs. Moreover, the side insertion procedure makes available, at all times, adjacent guide surfaces for the guide wheels 253 and provides at least two locating surfaces for each core block as it is placed. If the central core block were to be placed before any of the surrounding core blocks, no adjacent locating surfaces would be available for the central core block. If the central core block were lowered straight down (i.e., no side insertion), locating would still not be as certain because no guide surfaces would be available for the grapple head as it passed the central core block downwardly in the core. After the central core block is inserted from the side, the last two core blocks (e.g., 6 and 7) in the layer may be placed.

Although the blocks in the central column of each region may be displaced downwardly from the blocks in adjacent columns, it is intended by the term "layer" to include a block in the central column which is approximately at the level of blocks in adjacent columns. If more than one core region is to be loaded or unloaded, the control rod and drive assembly above one region is removed, the sleeve inserted, and the previously described procedure carried out, before another penetration is used. When the desired work in connection with one region has been completed, the sleeve is removed and the control rod and drive assembly is replaced. After this, the control rod and drive assembly may be removed from another penetration and the foregoing process repeated. Thus, the core is loaded and unloaded, region by region, using a single penetration for each region.

By utilizing the method of the invention for loading and unloading the core, less room above the core is required than in the case where an entire column of core blocks joined together, or where a single elongated core element, is removed. This is because clearance between the top of the core and the top of the interior chamber of the reactor vessel should usually be sufficient, in the latter case, to enable the full length of the core element or column of blocks to be positioned uprightly therein, clear of the core, before it can be moved into alignment with the penetration. Moreover, the method of the invention facilitates design of the handling equipment, since it is unnecessary for the handling equipment to move deeply into the core between adjacent columns of core blocks, as would be the case if each core block in a single column were removed before proceeding to the next column.

III. CONCLUSIONS

It may therefore be seen that the invention provides a core element handling system of improved design and which uses no reactor vessel penetrations other than those penetrations which exist for accommodating control rod and drive assemblies. The complexity and cost over heretofore known systems for comparable reactors is substantially reduced, and reliability and control is facilitated. Repair to the hoist mechanism of the handling machine is readily possible but difficulties encountered in connection with heavy shielding on the handling machine are avoided. Jamming of the grapple head of the system in a position unaligned with a penetration may be easily overcome, and the danger of a dropper core element in the event of a power failure is avoided. Moreover, the invention provides an improved unloading and loading method which substantially simplifies the design of system apparatus.

Various embodiments of the invention, other than those shown and described herein, will be apparent to those skilled in the art from the foregoing description and accompanying drawings. Such other embodiments, and modifications thereof, are intended to fall within the scope of the appended claims.

What is claimed is:

1. A core element handling system for a nuclear reactor of the type which comprises a plurality of removable core elements forming a core and a reactor vessel enclosing the core and having at least one penetration therein, said handling system including in combination, a sleeve adapted to fit within the penetration, means for inserting and removing said sleeve in and from the penetration, and a handling machine adapted to be positioned over the penetration, said handling machine having a lifting assembly and means for moving said lifting assembly into said sleeve, said handling machine having at least one guide tube adapted to be positioned in axial alignment with said sleeve over said penetration for receiving said lifting assembly, said guide tube having guiding and positioning means thereon for facilitating passage of said lifting assembly between said guide tube and said sleeve, said lifting assembly including pickup means adapted to releasably attach to the removable core elements for transporting such elements through the penetration, said sleeve having means thereon identical with said guiding and positioning means on said guide tube for guiding and positioning said lifting assembly in said sleeve and said lifting assembly including a telescopable section which comprises inner and outer coaxial telescopable tubes adapted to expand axially within said sleeve such that said outer coaxial tube of said telescopable section remains within said sleeve for guiding and positioning said lifting assembly and such that said inner coaxial tube of said telescopable section extends beyond the end of said sleeve for reaching the core elements, and wherein a pneumatic device couples said tubes to each other and is actuated to move said tubes from a fully telescoped condition to an extended condition.

2. A system in accordance with claim 1 wherein said handling machine includes means attached to said inner tube for moving said lifting assembly.

3. A system in accordance with claim 1 wherein support means are provided on said handling machine, and wherein said system further includes a removable platform adapted to be supported on said handling machine by said support means and having shielding thereon of sufficient thickness to provide a biological shield for personnel on said platform.

4. A system in accordance with claim 1 wherein said handling machine includes a radiation shielded housing defining an annular storage region for the core elements surrounding said guide tube, said housing further defining a passage for receiving said lifting assembly, said passage being positioned in axial alignment with said guide tube above same, said passage being spaced from said guide tube a distance sufficient to allow said lifting assembly to pass core elements to and from said annular storage region, said housing having means thereon at said passage identical with said guiding and positioning means on said guide tube for facilitating passage of said lifting assembly between said passage and said guide tube.

5. A system in accordance with claim 1 wherein said pickup means comprise a support structure, a grapple head, a link having one end pivotally secured to said grapple head and being pivotally secured intermediate its ends to said support structure, an actuator arm having one end pivotally secured to the end of said link opposite said grapple head, said lifting assembly including drive means secured to the end of said actuator arm opposite said link for moving said grapple head to a position unaligned with said sleeve, at least a portion of said actuator arm being of a material which is meltable at a temperature lower than the melting temperature of the material of said link, whereby said actuator arm may be disabled if necessary to effect removal of said grapple head from the reactor vessel.

6. A system in accordance with claim 1 wherein said pickup means comprise a support structure, a grapple head, at least one pivotal link coupling said grapple head to said support structure, means for pivoting said link and said support structure to position said grapple head, and optical viewing means mounted on said link and operable to view operations within the reactor vessel, said pivoting means thereby being operable to aim said viewing means as well as position said grapple head.

7. A system in accordance with claim 1 wherein said pickup means comprise a grapple head, a rotary support mounted for rotation at one end of said inner tube, a link having one end pivotally secured to said grapple head, said link being pivotally secured intermediate its ends to said rotary support such that said grapple head moves through an arcuate path in response to pivoting of said link on said rotary support, which arcuate path lies in a plane substantially parallel with the axis of rotation of said rotary support, an actuator arm having one end pivotally secured to the end of said link opposite said grapple head, a first step motor coupled to said rotary support for rotating same, a second step motor mounted on said rotary support, and means coupling said step motor to the end of said arm opposite said link for actuating said arm to pivot said link.

8. A system in accordance with claim 1 wherein said pickup means include a grapple head for engaging the core elements, said grapple head comprising a grapple operable between a first condition adapted to be disengaged from a core element and a second condition adapted to be engaged with a core element, a grapple actuator member movable between a first position wherein said grapple is in said first condition to a second position wherein said grapple is in said second condition, spring means biasing said actuator member toward said second position, and pneumatic means for displacing said actuator member to said first position.

9. A system in accordance with claim 8 wherein said grapple comprises a plurality of fingers arranged radially about said actuator member, each of said fingers being disposed adjacent said actuator member with the latter in said first position, each of said fingers having means thereon for contacting a core element, said actuator member having a protrusion thereon engageable with said fingers in said second position to displace said fingers radially outward for contacting the core element.

References Cited

UNITED STATES PATENTS

| 3,165,212 | 1/1965 | Gerard | 176—30 |
| 3,179,569 | 4/1965 | Fortescue et al. | 176—30 |
| 3,232,840 | 2/1966 | Pounder et al. | 176—30 |

FOREIGN PATENTS

| 885,707 | 12/1961 | Great Britain. |
| 898,895 | 6/1962 | Great Britain. |
| 916,980 | 1/1963 | Great Britain. |
| 936,455 | 9/1963 | Great Britain. |

CARL D. QUARFORTH, *Primary Examiner.*

H. E. BEHREND, *Assistant Examiner.*